J. R. DUNHAM.
FLEXIBLE COUPLING.
APPLICATION FILED FEB. 16, 1918.
1,298,680.
Patented Apr. 1, 1919.
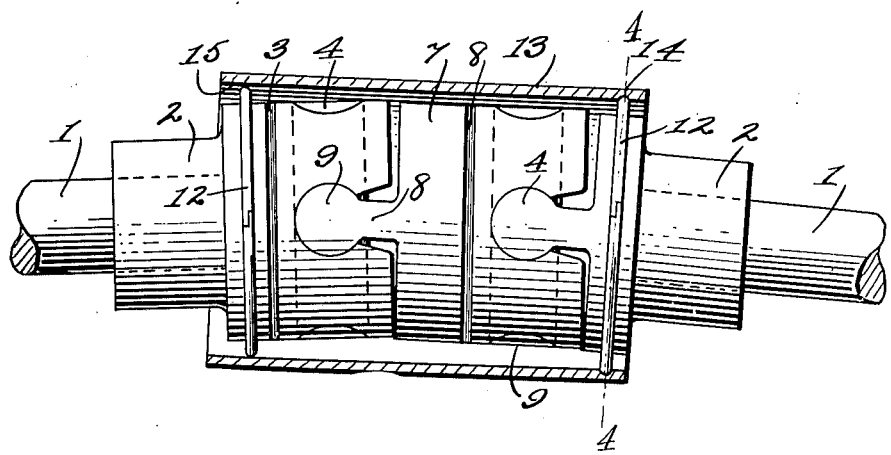
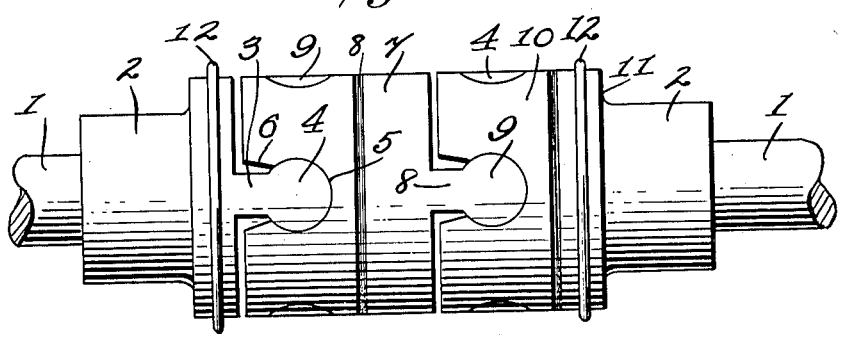
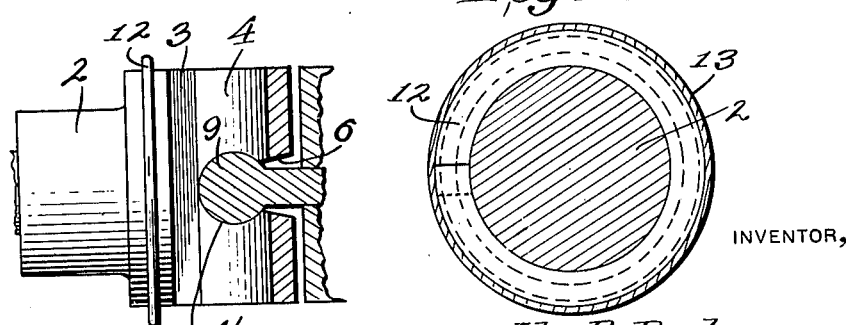
INVENTOR,
John R. Dunham,
BY Richard B. Owen,
ATTORNEY.
WITNESSES

UNITED STATES PATENT OFFICE.

JOHN R. DUNHAM, OF NEW BRUNSWICK, NEW JERSEY.

FLEXIBLE COUPLING.

1,298,680.          Specification of Letters Patent.          Patented Apr. 1, 1919.

Application filed February 16, 1918. Serial No. 217,586.

*To all whom it may concern:*

Be it known that I, JOHN R. DUNHAM, a citizen of the United States, residing at New Brunswick, in the county of Middlesex and State of New Jersey, have invented certain new and useful Improvements in Flexible Couplings, of which the following is a specification.

My invention relates to new and useful improvements in flexible couplings, and which may also be used in connection with flexible shaftings by simply increasing the number of units until the desired length of shafting is obtained.

An important object of my invention is to provide a device including a pair of male units co-acting with female units and with each other to prevent the various parts of the device from becoming disengaged.

Another object of my invention is to provide a device including male and female units having retaining means arranged upon opposite ends of said units and at an angle to one another.

Another object of my invention is to provide a device including means whereby one unit adjacent another executes its respective pivotal movement in a plane at right angles to its co-acting unit.

Another object of my invention is to provide a device including a plurality of units whereby one section of a shaft may be arranged at angular or direct offset position with relation to the other portion of the shaft.

A still further object of my invention is to provide a device including a casing to surround the units of the coupling which allows the proper movement of the units caused by the mis-alinement of the sections of the shaft and at the same time closes the ends of the coupling to prevent the escape of oil or grease.

Other objects and advantages of the invention will become apparent during the course of the following description.

In the accompanying drawings forming a part of the description and wherein like numerals are employed to designate like parts throughout the same, Figure 1 is a view of the coupling showing the same in its angular offset position, and a sectional view of the casing surrounding said coupling, Fig. 2 is a top view of the coupling with the casing removed, Fig. 3 is a vertical sectional view of the left hand terminal end of the coupling in the position shown in Fig. 1, and Fig. 4 is a transverse sectional view through one of the terminals.

In the drawings wherein is shown a preferred embodiment of my invention, the numeral 1 designates a spindle, the end of which is provided with an enlarged head 2. The face of this head 2 is provided with a diametrical rib 3, the outer end of which is provided with an enlarged head 4, which is substantially cylindrical in shape. This rib and head 4 form what is called a knuckle rib. This knuckle rib is provided with a central transverse groove 4' therethrough, which is substantially of semi-circular shape for a purpose which will hereinafter appear.

The unit which is adapted to be pivotally secured to the head is a female unit which is provided upon each end with a diametrically extending groove 5 which grooves are adapted to be arranged at right angles to one another and are further adapted to communicate with one another at a point intermediate their ends. The bottom of each of these grooves is substantially circular in cross-section for the reception of knuckle ribs such as shown by the numerals 3 and 4. The grooves 5 almost complete a circle in cross-section, but before the tops of these grooves complete the circle, the edges 6 of these grooves diverge outwardly to the ends of the female units. Since the tops of the grooves 5 diverge outwardly it will be seen that one unit may be swung upon the other a substantial distance since the rib 3 of the knuckle rib is of less width than the tops of the grooves in the female unit.

The intermediate unit in the coupling is in the form of a male unit 7, and is provided upon each end thereof with a diametrically extending rib 8, which is provided with an enlarged top portion 9 which is substantially cylindrical in configuration. These two ribs are arranged at right angles to one another for a purpose which will hereinafter appear.

The next unit in the coupling is a female unit 10 which pivotally connects the male unit 7 to the terminal end 11 which is similar in construction to the terminal head 2.

It will be seen that when the knuckle rib of the terminal head is placed in its respective groove in the female unit adjacent thereto, the transverse groove 4' in the knuckle rib of this terminal head will conform to the configuration of the bottom of the groove 5. The knuckle rib of the male unit 7 which is not provided with a transverse groove therein, is positioned in the groove in the other end of the female unit, which extends at right angles to the groove which occupies the knuckle rib of the terminal head 2. It will be evident that the rib of this male unit 7 passes through the groove in the female unit and also through the transverse groove in the knuckle rib of the terminal head. Accordingly it will be seen that the male and female units are locked together so that they cannot disengage with one another, due to any torsional strain upon the coupling or any angular or direct offset of the sections of the shafting.

Each of the terminal units 2 and 11 are provided with an annular recess therein which is adapted to receive a split ring 12. A cylindrical casing 13 is provided at one end upon its inner wall with an annular depression or recess 14 which is adapted to be snugly engaged with one of the rings 12 for securing the casing 13 upon the coupling. The opposite inner wall 15 of the casing is adapted to frictionally engage the outer periphery of the ring upon the other terminal unit. It will be seen that the casing 13 will permit the coupling to move or execute any of its movements, since the casing is of greater diameter than the units thereby permitting the units to move within the casing while the end 15 of the casing will ride or oscillate over its respective ring 12. This casing also insures against the escape of oil or grease from around the coupling. As usual the casing 13 is provided with an oil opening. To construct a flexible shafting from the units which have been described, it is simply necessary to multiply the number of units until the desired length of shafting is attained. In constructing a flexible shafting one of the knuckle ribs of the male units as shown by the numerals 8 and 9, may be provided with a transverse groove intermediate its ends, similar to the groove 4' in the knuckle rib of the terminal head 2. This rib will co-act with the groove in the adjacent female unit and also with the adjacent rib of the next male unit.

It is thought from the description that the operation of the various parts will be readily apparent since the various units will pivot at their centers by means of the knuckle rib of the male units coöperating with the grooves in the female units.

It is to be understood that the form of my invention herewith shown and described is to be taken as a preferred example of the same and that various changes in the shape, size and arrangement of parts may be resorted to without departing from the spirit of the invention or the scope of the subjoined claims.

Having described my invention I claim:

1. A device of the class described comprising male units, a rib provided upon each end of each unit, female units provided with a groove in each end thereof, said ribs of the male units adapted to be received in the grooves in the female units and said ribs being adapted to interlock with one another in the female units.

2. A device of the class described comprising male units each being provided with a knuckle rib upon each end thereof, one of said ribs being provided with a transverse groove, female units provided with a groove upon each end thereof, and said grooves adapted to communicate for the reception of said knuckle ribs for interlocking the knuckle ribs of the male units together and to the female units.

3. A flexible coupling comprising male units, a female unit interposed between each pair of male units, and the ends of the male units adjacent the female units being interlockingly engaged in the female units.

4. A flexible coupling including a plurality of units pivoted together, a ring carried by each of the terminal units, a cylindrical casing of greater diameter than the units provided on one end upon its inner face with an annular depression adapted to engage one of said rings therein for securing the casing to the coupling, and the inner face of the opposite end of said casing adapted to oscillate over the other ring.

5. A flexible coupling including a plurality of units pivoted together, a ring carried by each of the terminal units, a rigid cylindrical casing of greater diameter than the units and having one end secured to one ring and its opposite end slidably engaged on the other ring.

In testimony whereof I affix my signature in presence of two witnesses.

JOHN R. DUNHAM.

Witnesses:
 WALTER C. MERRILL,
 JAMES FONRATT.